June 28, 1932.  W. R. GRISWOLD  1,864,904
INTERNAL COMBUSTION ENGINE
Original Filed March 5, 1928   2 Sheets-Sheet 1

Inventor
WALTER R. GRISWOLD
By Milton Tibbetts
Attorney

June 28, 1932.  W. R. GRISWOLD  1,864,904
INTERNAL COMBUSTION ENGINE
Original Filed March 5, 1928  2 Sheets-Sheet 2

Inventor
WALTER R. GRISWOLD
By Milton Tibbetts
Attorney

Patented June 28, 1932

1,864,904

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed March 5, 1928, Serial No. 259,153. Renewed August 29, 1931.

This invention relates to internal combustion engines and particularly to means for damping torsional vibration of the crank shafts of such engines. It is especially adapted to, and has been described in connection with an engine in which the crank shaft has more than one crank between adjacent shaft bearings, so that there is a crank cheek or crank arm common to two cranks.

One of the objects of the invention is to provide effective means for damping torsional vibration in engine shafts which shall not increase any of the engine dimensions, particularly the overall length thereof.

Another object of the invention is to provide such damping means which may be readily housed within the engine crank case, without necessitating changes in the mounting and arrangement of the drive for the engine accessories and other connected elements, and without interference with existing engine parts.

Another object of the invention is to provide a vibration damper which may be mounted on a cheek or arm of the crank shaft and which will not disturb the static or dynamic balance of the shaft.

Other objects of the invention will appear from the following description taken in connection with the drawings, which form a part of this specification, and in which.

Figure 1:
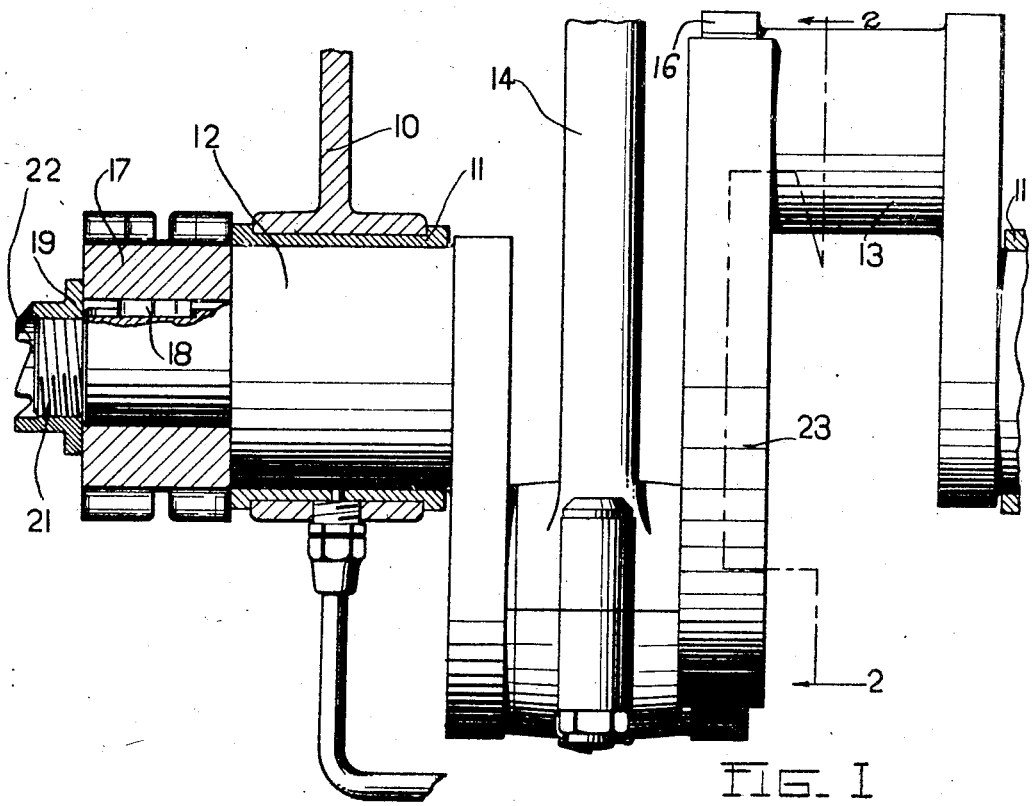
Fig. 1 is a view, partially in side elevation and partially in longitudinal vertical section through part of an internal combustion engine embodying the invention.

Referring to the drawings, 10 represents a part of the crank case of an internal combustion engine, being one of a number of transverse webs therein. These webs support suitable aligned bearings 11 for an engine crank shaft 12, the latter having the usual integral cranks 13 each of which is connected by a connecting rod 14 with a piston mounted in one of the engine cylinders, the piston and cylinder not being shown in the drawings, but being of usual construction. In the embodiment of the invention shown, the crank shaft 12 is of that type in which the cranks 13 are formed in pairs between adjacent bearings 11, each pair having a common crank arm or cheek 16, but it is to be understood that the invention is not limited to shafts of this type but may be applied to crank shafts having any of the well known arrangements of cranks and bearings.

The forward end of the crank shaft 12 may be reduced in diameter and provided with a gear or sprocket 17, rotatably secured thereto as by a key 18, through which the engine camshaft and other engine accessories may be driven by an intermeshing gear or a sprocket chain (not shown). The gear 17 may be conveniently retained in axial position by a nut 19 screwed to the reduced end 21 of the shaft and provided with teeth 22, which may be engaged with teeth on a suitable starter shaft (not shown).

The damping means of this invention is illustrated as mounted near the forward end of the crank shaft 12, on the crank arm 16 thereof. It is in the form of a pair of weight or inertia members 23, arcuate in shape and preferably conforming in contour to the circle of rotation, which are pivotally mounted on the sides of the crank arm to oscillate in the plane of rotation thereof. The mounting means may be of any suitable construction, but in the present embodiment it consists of a pair of supporting members or plates 24, rigidly secured to the sides of the arm as by bolts 26. Each of the plates 24 is provided with a integral lug or hinge member 27 which is bored to form a suitable pin bearing 28. This hinge member 27 is disposed between a pair of similar lugs or members 29, integral with the inertia member 23 and similarly provided with holes 31 which are in line with the bearing hole 28. The inertia member 23 is secured to its supporting member 24 by a pivot or hinge pin 32 of any suitable form, which passes through the holes 31 and the bearing 28, and about which the inertia member may oscillate. The pin 32 may be retained in position in any convenient way, as by a lock pin 33, which is threaded into the inertia member 23 and which has a reduced end engaging a recess in the pin 32. This pivot pin 32 is thus made to turn with the inertia member during oscillatory movement thereof and has a bearing on the member 24 which is secured to the crank arm. These parts are preferably so designed that there is considerable friction or resistance to turning between the pin 32 and the bearing 28.

Figure 2:
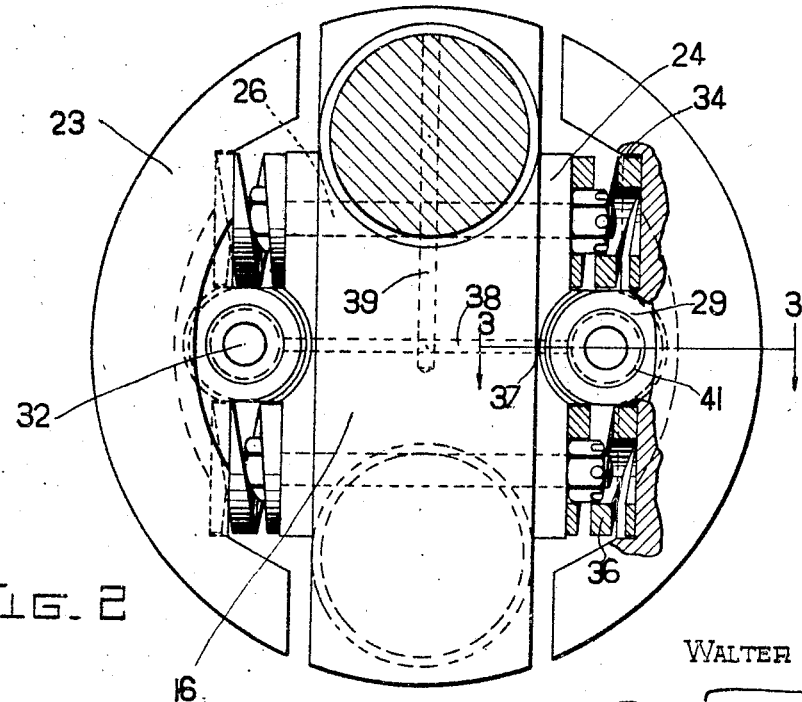
Fig. 2 is an end view of the double crank arm showing the invention, partially in transverse section substantially on the line 2—2 of Fig. 1.
Figure 3:
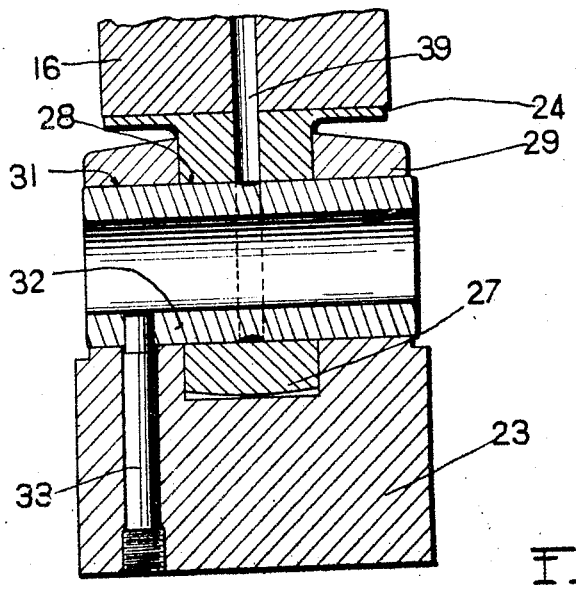
Fig. 3 is a section substantially on the line 3—3 of Fig. 2.

Each of the inertia members 23 is also provided with a pair of spaced recesses 34, disposed toward the crank arm 16 which provide seats for a pair of compression springs 36, preferably of helical form as shown. These springs 36 seat at their other ends on the plate 24, and they may be conveniently positioned thereon by the heads of the retaining bolts 26, or the nuts thereof, which are disposed within their end turns, as clearly shown in Fig. 2. The springs 36 are spaced equidistant from the axis of oscillation through the pivot 32 and are of substantially equal strength, so that they exert upon the inertia member 23 equal and opposite turning moments tending to rotate the inertia member about the pivot 32. They thus act to urge the inertia member toward its neutral position with respect to the crank cheek, and to return it to this neutral position after any oscillatory displacement therefrom.

The combined pressure of the springs 36 is also exerted upon the inertia member in such a way as to urge it bodily away from the crank cheek 16. This greatly increases the bearing pressure between the pin 32 and the bearing 28, and consequently increases the frictional resistance to turning of said bearing. It is this friction which provides the damping effect of the device.

If desired, the bearing surface 28 may be lubricated from the engine lubricating system, by means of a passage 37 in the supporting plate 24, which communicates through a passage 38 in the crank arm with the usual lubrication conduit 39 which is adapted to supply lubricant to the crank pins. This passage 37 may communicate with a groove 41 circumferentially disposed on the pin 32, from which lubricant is distributed over the entire bearing surface 28.

The operation of this device will be readily understood from the above description. During normal rotation of the crank shaft 12, the inertia members 23 rotate therewith on the crank cheek 16, and as these members are of equal mass and symmetrically disposed with respect to the axis of rotation, they do not disturb the balance of the shaft in any way. Upon the inception of a torsional vibration, however, an alternating motion of high frequency is superposed on the shaft, which the members 23 are unable to follow because of their inertia. This causes the members to rock or oscillate upon the pivotal mountings 32 with respect to the crank arm, which movement is opposed by the springs 36, which are alternately compressed, and also by the considerable friction in the pivotal mountings at the surface 28. This friction transforms part of the energy of vibration into heat, in which form it is dissipated from the system by radiation. Such dissipation of vibratory energy is sufficient to prevent the resonant growth of the vibration, and the disturbance is accordingly damped.

Figure 4:
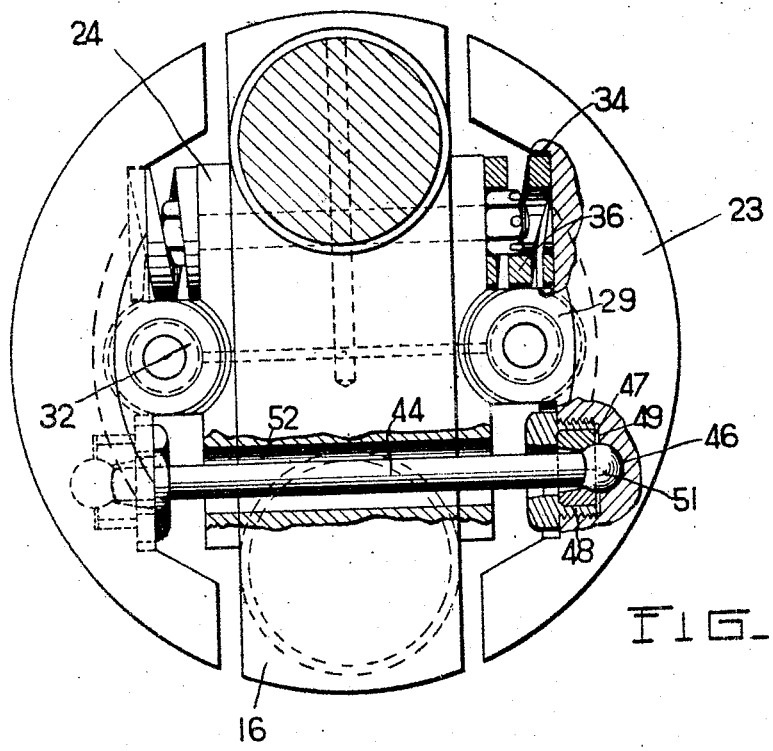
Fig. 4 is a view, similar to Fig. 2, showing a modified form of the invention.

In Fig. 4 is illustrated a modified form of this invention, in which the springs 36 at one end of the pair of inertia members are dispensed with, a spacing member or strut 44 being used to separate the adjacent ends of these members. In this construction the spring seats 34 at one end of each of the inertia members are omitted, the member being provided with a ball seat 46, formed as a hemispherical depression at the bottom of a recess 47. This recess 47 is preferably threaded for the reception of a bushing 48 in which a ball retaining member 49 is mounted. The spacing member is formed with ball ends 51 which are adapted to seat in the sockets 46, and are retained therein by the member 49, and this member 44 passes through suitable aligned openings 52 provided in the crank arm 16 and the supporting members 24.

The members 23 are pivotally mounted on the pins 32, as in the construction previously described, and are also provided with the springs 36, and it is evident, therefore, that the member 44 is maintained under compression by the expansive action of the springs, the reaction being taken at the bearing surface 28. It will also be evident that in this embodiment of the invention the inertia weights 23 are not permitted to oscillate independently of each other on the crank arm, but are constrained to operation in unison by reason of the connection provided by the spacing member 44. Considerable friction is produced in this form of the device between the ball members 51 and their sockets or seats 46, which friction is added to the friction at the surface 28 and tends to increase the effectiveness of the damper.

It will be seen that this invention provides a simple and effective vibration damper, which by reason of its mounting on the engine crank cheek and within the circle of rotation thereof, does not in any way increase the length of the engine, or any of its other dimensions. Being located on a crank cheek behind the first crank shaft bearing 11, it does not necessitate any change in the arrangement of the driving pinion 17 at the front end of the engine.

Moreover, as the inertia members are of equal mass and are symmetrically disposed about the axis of rotation, each acts as a counterweight for the others, so that the balance of the crankshaft is not in any way disturbed.

It will be understood that various forms of the invention other than those described above may be used without departing from the spirit or scope of the invention.

What is claimed and desired to be secured by Letters Patent, is:

1. A vibration damper for crank shafts having its end cranks connected by a common arm, of balanced inertia members pivotally mounted on said arm to oscillate in the plane of rotation thereof, and means connecting said inertia members and the arm to increase the frictional resistance to oscillation in said mounting.

2. A vibration damper for crank shafts having a crank arm comprising a pair of inertia members of substantially equal mass on opposite sides of said arm, pivotal means connecting each of the inertia members to the arm for oscillation thereon, and means to increase the friction at each of the pivots.

3. A vibration damper for crank shafts having a crank arm, comprising balanced inertia members pivotally mounted on said arm to oscillate in the plane of rotation thereof, and means including springs between each inertia member and the arm and a spacing member between the inertia members to increase the frictional resistance to turning of said pivotal means.

4. A vibration damper for crank shafts having a crank arm comprising pivot members symmetrically disposed about the axis of rotation of said shaft, and inertia members of substantially equal mass carried on said pivot members, said pivot members having a substantial frictional resistance to oscillatory movements of the inertia members thereon.

5. A vibration damper for crank shafts having a crank arm comprising supports secured to the crank arm having integral lugs provided with pivot bearings, pivot pins mounted to oscillate against friction in said bearings, and inertia members of equal mass mounted on said pins and symmetrically disposed with respect to the axis of rotation of the crank shaft.

6. A vibration damper for crank shafts having a crank arm comprising pivot members oppositely disposed on said crank arm, inertia members of substantially equal mass pivotally mounted on said pivot members, spring means between each inertia member and the arm at one side of the plane of the pivot members, and a spacing member connecting the inertia members on the other side of said plane.

7. In a vibration damper for a crankshaft having a crank arm, the combination with a pair of inertia members of substantially equal mass, of means for supporting said members on opposite sides of said crank arm for oscillatory movement with respect thereto, and means for absorbing the oscillatory energy of said inertia members.

8. In a vibration damper for a crankshaft having a crank arm, the combination with a pair of inertia members of substantially equal mass, of means for supporting said members on opposite sides of said crank arm for oscillatory movement with respect thereto, said means including resilient elements interposed between said crank arm and said members for yieldably resisting oscillatory movement of the latter.

9. In a vibration damper for a crankshaft having a crank arm, the combination with a pair of inertia members of substantially equal mass, of means for supporting said members on opposite sides of said crank arm for oscillatory movement in the plane of the crank arm, said members being substantially symmetrical with respect to the axis of rotation of the shaft, and means for resisting and absorbing the energy of the oscillatory movement of said members.

10. In a vibration damper for a crankshaft having a crank arm, the combination with a pair of inertia members of substantially equal mass, of means for pivotally mounting said members on opposite sides of the crank arm so as to maintain the balance of the shaft, and yieldable means interposed between each inertia member and the arm on each side of said means.

In testimony whereof I affix my signature.

WALTER R. GRISWOLD.